United States Patent
Qiu et al.

(10) Patent No.: US 10,268,678 B2
(45) Date of Patent: Apr. 23, 2019

(54) CORPUS GENERATION DEVICE AND METHOD, HUMAN-MACHINE INTERACTION SYSTEM

(71) Applicant: SHENZHEN GOWILD ROBOTICS CO., LTD., Shenzhen (CN)

(72) Inventors: Nan Qiu, Shenzhen (CN); Haofen Wang, Shenzhen (CN)

(73) Assignee: SHENZHEN GOWILD ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 15/694,918

(22) Filed: Sep. 4, 2017

(65) Prior Publication Data

US 2018/0004730 A1 Jan. 4, 2018

Related U.S. Application Data

(63) Continuation-in-part of application No. PCT/CN2016/087757, filed on Jun. 29, 2016.

(51) Int. Cl.
*G06F 17/21* (2006.01)
*G06F 17/27* (2006.01)
*G06F 17/28* (2006.01)

(52) U.S. Cl.
CPC ........ *G06F 17/2785* (2013.01); *G06F 17/218* (2013.01); *G06F 17/274* (2013.01); *G06F 17/2775* (2013.01); *G06F 17/289* (2013.01)

(58) Field of Classification Search
None
See application file for complete search history.

(56) References Cited

U.S. PATENT DOCUMENTS

| | | | |
|---|---|---|---|
| 8,799,776 B2 * | 8/2014 | Todhunter | G06F 17/30719 715/256 |
| 9,009,590 B2 * | 4/2015 | Todhunter | G06F 17/30719 715/256 |
| 9,418,150 B2 * | 8/2016 | Charlot | G06F 17/30731 |
| 9,779,079 B2 * | 10/2017 | Roux | G06F 17/271 |
| 2003/0182102 A1 * | 9/2003 | Corston-Oliver | G06F 17/2881 704/9 |

(Continued)

*Primary Examiner* — Fariba Sirjani
(74) *Attorney, Agent, or Firm* — Im IP Law; C. Andrew Im; Chai Im

(57) ABSTRACT

A corpus generation device and method, the device comprising: a segmentation module, connected to at least one monolingual parallel corpus for segmenting a sentence into words and processing the segmented words by a knowledge-driven approach; a classification module, for classifying sentences having different tag sequences but the same meaning into the same sentence cluster; a mapping module, for determining the categories of sentence structures of all the sentences in the sentence cluster, recording and storing a mapping mode for transforming tags between sentence structures when different categories of sentence structures in the same sentence cluster are transformed; a sentence structure generation module, for generating sentence structures according to a first mapping mode between a first category of sentence structures in one of the sentence clusters and other categories of sentence structures in the same sentence cluster; and a corpus generation module, for nesting a word corresponding to a sequence tag to generate a new monolingual parallel corpus.

18 Claims, 5 Drawing Sheets

(56) References Cited

U.S. PATENT DOCUMENTS

| | | | |
|---|---|---|---|
| 2005/0171759 A1* | 8/2005 | Uchimoto | G06F 17/2863 704/9 |
| 2006/0217963 A1* | 9/2006 | Masuichi | G06F 17/2836 704/7 |
| 2006/0293876 A1* | 12/2006 | Kamatani | G06F 17/2785 704/2 |
| 2007/0073534 A1* | 3/2007 | Guo | G06F 17/2715 704/9 |
| 2007/0179776 A1* | 8/2007 | Segond | G06F 17/2247 704/9 |
| 2008/0300862 A1* | 12/2008 | Roux | G06F 17/271 704/9 |
| 2012/0179696 A1* | 7/2012 | Charlot | G06F 17/30731 707/750 |
| 2013/0103390 A1* | 4/2013 | Fujita | G06F 17/2765 704/9 |
| 2014/0200878 A1* | 7/2014 | Mylonakis | G06F 17/2818 704/4 |
| 2017/0004129 A1* | 1/2017 | Shalaby | G06F 17/2785 |
| 2017/0323371 A1* | 11/2017 | Lampert | G06Q 10/0833 |

* cited by examiner

CORPUS GENERATION DEVICE AND METHOD, HUMAN-MACHINE INTERACTION SYSTEM

RELATED APPLICATIONS

This is a continuation-in-part application of International Application PCT/CN2016/087757, with an international filing date of Jun. 29, 2016, which is incorporated herein by reference in its entirety.

FIELD OF THE INVENTION

The present invention relates to the field of word processing, in particular to a corpus generation device and device, human-machine interaction system.

BACKGROUND OF THE INVENTION

With the development of the Internet, the requirement for network search is getting higher and higher. Therefore, more key words and corpora are required to be stored in a cloud corpus server for a netizen to use when in search on a network.

The commonly used parallel corpora at present are bilingual/multilingual corpora consisting of an original text and a parallel translated text, and the alignment degree thereof consists of a word level, a sentence level, a paragraph level and an article level. According the different translation directions, the parallel corpora are divided into three forms: uni-directional parallel corpora, bi-directional parallel corpora and multi-directional parallel corpora.

At present, the establishment of a parallel corpus requires the aid of auxiliary means which generally comprise the steps of de-drying, segmentation, punctuation processing, alignment mark adding, parallel and the like. In the process of establishing a parallel corpus, a great deal of manpower and material resources are consumed, and the updating of the corpus is not timely, thus the real time of the corpus cannot be guaranteed.

Existing technologies also adopt a distance edition method to expand a corpus through the operations of deleting, shifting, interpolating and the like, but the practical operation process is bothersome.

The expression modes of languages are rich and varied, and a sentence may be formed only by randomly combining several words. If a corpus sequentially acquires and inputs all the corpora, a great many of efforts are required to be invested and omission is easy to occur. Furthermore, the establishment of a parallel corpus at present requires the participation of manpower, and requires a large number of industrial professionals and translators to consume a lot of time and energies.

OBJECTS AND SUMMARY OF THE INVENTION

The technical problem to be solved by the present invention is providing a corpus generation device and method which can acquire a corpus by nesting a word in an expanded sentence structure. The present invention is simple to operate, saves resources, and can expand a corpus to a great extent.

To solve the above-described technical problem, the present invention adopts a technical solution as follows: providing a corpus generation device, the device comprising: a segmenter, connected to at least one monolingual parallel corpus and configured for segmenting sentences in each monolingual parallel corpus into words, and tagging the segmented words by a knowledge-driven approach; a classifier, for identifying the knowledge-driven sentence, and classifying sentences having different tag sequences but the same meaning into the same sentence cluster; a mapper, for analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed; a sentence structure generator, for searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and a corpus generator, for nesting a word corresponding to the sequence tag of a sentence structure in the sentence cluster into the generated new sentence structures to generate a new monolingual parallel corpus.

To solve the above-described technical problem, the present invention adopts a technical solution as follows: providing a corpus generation method, the method comprising the steps of: segmenting each sentence in at least one monolingual parallel corpus into words, and tagging the segmented words by a knowledge-driven approach; identifying the knowledge-driven sentence, and classifying sentences having different tag sequences but the same meaning into the same sentence cluster; analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed; searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and nesting a word corresponding to the sequence tag of a sentence structure in the sentence cluster into the generated new sentence structures to generate a new monolingual parallel corpus.

Different from the prior art, the corpus generation device of the present invention tags the sentences in an existing corpus, can acquire more sentence structures by mapping the sentence structures having different tag sequences according to the tags of the sentence structures, and can acquire more corpora by filling and nesting the words corresponding to the tags. The present invention can acquire a corpus by nesting a word in an expanded sentence structure, is simple to operate, saves resources, and expands the corpus to a great extent.

On the basis of the corpus generation method, the present invention provides a human-machine interaction system, comprising a microphone, an analog-to-digital converter, a voice identification processor, a natural language processor, a voice synthesizer, a power amplifier, a loudspeaker, a corpus server, and a corpus generation processor, wherein a plurality of monolingual parallel corpora are stored in the corpus server;

The microphone, the analog-to-digital converter, the voice identification processor, the natural language processor, the voice synthesizer, the power amplifier and the loudspeaker are sequentially connected; the corpus server is connected to the natural language processor; and the corpus generation processor is connected to the corpus server;

The microphone is configured for acquiring a voice signal from a user when the user and a robot are dialoging; the analog-to-digital converter is configured for converting the voice signal into voice digital information; the voice identification processor is configured for converting the voice digital information into text information, and inputting the text information into the natural language processor;

The natural language processor is configured for analyzing and determining the text information, generating an appropriate reply message by combining the corpora in the corpus server, transmitting the reply message to the voice synthesizer, and storing the text information and the reply message in the corpus server;

The voice synthesizer is configured for generating a voice signal according to the reply message, amplifying the voice signal via the power amplifier, and playing the amplified voice signal via the loudspeaker; and The corpus generation processor is configured for executing programs to realize the following steps:

segmenting each sentence in at least one monolingual parallel corpus into words, and tagging the segmented words by a knowledge-driven approach;

Identifying the knowledge-driven sentence, and classifying sentences having different tag sequences but the same meaning into the same sentence cluster;

analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed;

searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and Nesting a word corresponding to the sequence tag of a sentence structure in the sentence cluster into the generated new sentence structures to generate a new monolingual parallel corpus, and storing the new monolingual parallel corpus in the corpus server.

The human-machine interaction system of the present invention tags the sentences in an existing corpus, can acquire more sentence structures by mapping the sentence structures having different tag sequences according to the tags of the sentence structures, and can acquire more corpora by filling and nesting the words corresponding to the tags. The present invention is simple to operate, saves resources, and can expand a corpus to a great extent. On the basis of the corpus generation processor capable of automatically expanding the corpus, the human-machine interaction system of the present embodiment can constantly automatically and recurrently produce new corpora, such that a robot can generate richer and more natural languages when having a voice chat with a user, thus enabling the language expression mode of the robot to be rich and varied. The system can increase the personified content of the robot during interaction, thus improving human-machine interaction experience.

On the basis of the corpus generation method, the present invention provides a search system, comprising a terminal device, a search server, a cloud server, a corpus server, and a corpus generation processor.

A user inputs a key word into the terminal device, and the terminal device transmits the key word to the search server;

The search server utilizes the corpora in the corpus server to generate a plurality of search words matched with the key word, searches in the cloud server for the information matched with the search words, and feeds back the searched information to the terminal device;

A plurality of monolingual parallel corpora are stored in the corpus server; the corpus generation processor is configured for executing programs to realize the following steps:

segmenting each sentence in at least one monolingual parallel corpus into words, and tagging the segmented words by a knowledge-driven approach;

Identifying the knowledge-driven sentence, and classifying sentences having different tag sequences but the same meaning into the same sentence cluster;

analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed;

searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and Nesting a word corresponding to the sequence tag of a sentence structure in the sentence cluster into the generated new sentence structures to generate a new monolingual parallel corpus, and storing the new monolingual parallel corpus in the corpus server.

On the basis of the corpus generation processor capable of automatically expanding the corpus, the search system of the present embodiment can constantly automatically and recurrently produce new corpora, such that the search system can generate more comprehensive search words during search according to the key word inputted by the user, thus improving search range and accuracy.

On the basis of the corpus generation method, the present invention provides a translation system, comprising a terminal device, a translation server, a corpus server, and a corpus generation processor.

A user inputs a to-be-translated sentence into the terminal device, and the terminal device transmits the to-be-translated sentence to the translation server;

A plurality of parallel corpora are stored in the corpus server;

The translation server utilizes the parallel corpora in the corpus server to acquire a translated sentence, and feeds back the translated sentence to the terminal device;

The corpus generation processor is configured for executing programs to realize the following steps:

Segmenting each sentence in at least one parallel corpus into words, and tagging the segmented words by a knowledge-driven approach;

Identifying the knowledge-driven sentence, and classifying sentences having different tag sequences but the same meaning into the same sentence cluster;

Analyzing the sentences in each sentence cluster of each parallel corpus, determining the categories of sentence structures of all the sentences in the sentence cluster, determining, recording and storing a mapping relationship for transforming tags between corresponding sentence structures when different categories of sentence structures in the same sentence cluster are transformed;

Searching for a first category of sentence structures in each sentence cluster of all the parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and Nesting a word corresponding to the sequence tag of a sentence structure in the sentence cluster into the generated new sentence structures to generate a new parallel corpus, and storing the new parallel corpus in the corpus server.

On the basis of the corpus generation processor capable of automatically expanding the corpus, the search system of the present embodiment can constantly automatically and recurrently produce new corpora, such that the translation system can acquire more accurate corpora to improve translation accuracy, and can automatically generate more sentence structures according to the existing corpora in the corpus, thus the same sentence expressed in different manners can be translated into the same translated text.

DETAILED DESCRIPTION OF THE EMBODIMENTS

The technical solution of the present invention will be further described in details in combination with specific embodiments. It is apparent that the described embodiments are only a part of the embodiments of the present invention, but not the whole. Based on the embodiments of the present invention, all the other embodiments obtained by those ordinary skilled in the art without inventive effort are within the scope of the present invention.

The establishment of a corpus is an important basis of a statistical learning method. In recent years, the great value of corpora resources for the study on the processing of natural languages has been accepted by more and more people. Particularly, the bilingual corpus has become an indispensable resource for the researches on machine translation, machine aided translation and translation knowledge acquisition. On the one hand, the emergence of the bilingual corpus has directly promoted the development of machine translation new technology. For example, the parallel corpora provide essential training data for the construction of a machine translation statistical model; and the corpus-based translation method, such as statistic-based, example-based and the like, provides new ideas for machine translation research effectively improves translation quality, and brings a new upsurge in the field of machine translation research. On the other hand, the bilingual corpus is an important source to acquire translation knowledge, from which a variety of fine-grained translation knowledge can be mined and learned, such as a translation dictionary and a translation template, so as to improve the traditional machine translation technology. In addition, the bilingual corpus is also an important basic resource for cross-language information search, translation dictionary compilation, automatic extraction of bilingual terms, comparative study of multiple languages and the like. The construction and acquisition of the bilingual parallel corpora are extremely difficult, and all countries have invested a lot of manpower, materials and financial resources. However, the sources of the bilingual parallel corpora mainly focus on specific fields such as government reports, news and laws, which are not suitable for a real text. In addition, large-scale bilingual texts on the Internet have good timeliness and coverage, which provides a potential solution for the acquisition of the bilingual parallel corpora.

Figure 1:
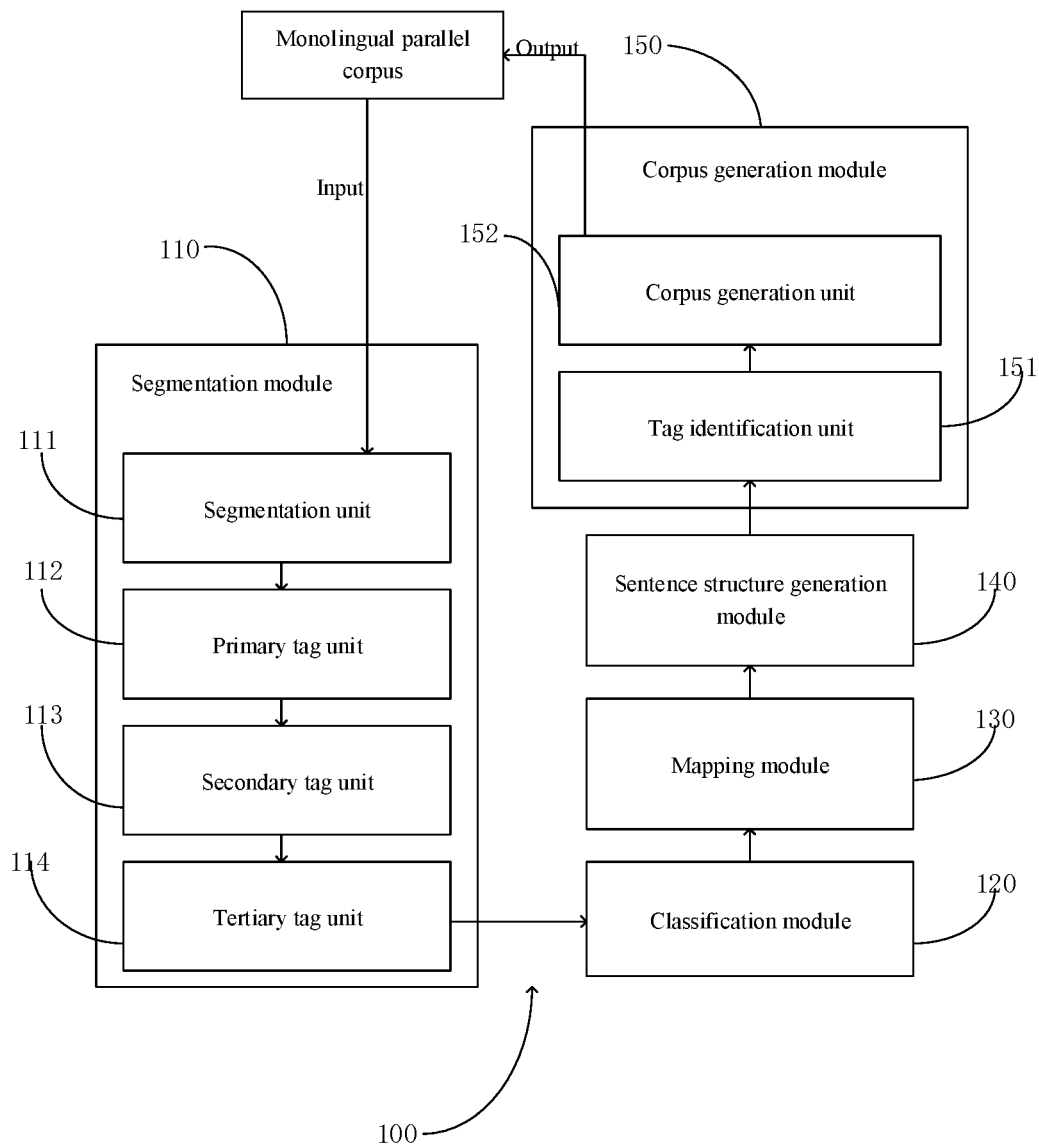
FIG. 1 is a structural schematic diagram of the corpus generation device according to an embodiment of the present invention.

Please refer to FIG. 1 which is a structural schematic diagram of the corpus generation device according to an embodiment of the present invention. The device 100 comprises a segmenter 110, a classifier 120, a mapper 130, a sentence structure generator 140 and a corpus generator 150.

Wherein the segmenter is connected to a monolingual parallel corpus 101, and is configured for segmenting sentences in the parallel corpus 101 into words, and tagging the segmented words by a knowledge-driven approach. Segmentation is generally performed by using segmentation tool software. The knowledge-driving process is also a sentence tagging process.

The segmenter 110 comprises a segmentation unit 111, a first tag unit 112 and a second tag unit 113. The segmentation unit 111 is connected to the segment tool software on the Internet, and imports a to-be-segmented sentence into the segment tool software for segmentation. After all the sentences in an existing corpus are segmented into words, the first tag unit 112 adds a first tag for the sentences according to the parts-of-speech of the words in each segmented sentence. The second tag unit 113 adds a second tag for the sentences according to the sentence elements the words act as. In the present embodiment, a Mandarin Chinese sentence "小红明天下午要去深圳市科技馆九层会议室参加科普知识讲座 (Xiaohong will go to attend a scientific knowledge lecture in a conference room on the ninth floor of Shenzhen Science and Technology Museum tomorrow afternoon)" is selected from a corpus, and is segmented into 小红 (Xiaohong)/明天 (tomorrow)/下午 (afternoon)/要 (will)/去 (go to)/深圳市 (Shenzhen)/科技馆 (Science and Technology Museum)/九层 (on the ninth floor of)/会议室 (in a conference room)/参加 (attend)/科普 (scientific)/知识 (knowledge)/讲座 (lecture)." "会议室 (conference room)" and "讲座 (lecture)" are nouns, and are marked with the same first tag, generally N (noun), according to the parts-of-speech thereof; "明天 (tomorrow)" and "下午 (afternoon)" represent time, and are marked with the first tag T (time); "参加 (attend)" is a verb, and is marked with the first tag V (verb); "要 (will)", "去 (go to)", "九层 (the ninth floor)" and "科普知识 (scientific knowledge)" are additional words, and can be omitted and not marked. After the first tags are marked, second tags can continue to be marked. With regard to the words "小红 (Xiaohong)", "深圳市 (Shenzhen)", "科技馆 (Science and Technology Museum)", "会议室 (conference room)" and "讲座 (lecture)" having marked with the first tag N (noun), "小红 (Xiaohong)" is a character noun, is the subject of the sentence, and is thus marked with the second tag NS (noun/subject); "深圳市 (Shenzhen)", "科技馆 (Science and Technology Museum)" and "会议室 (conference room)" are nouns respectively representing places having different place ranges, and are usually adverbial modifiers, wherein the ranges represented by the three words "深圳市 (Shenzhen)", "科技馆 (Science and Technology Museum)" and "会议室 (conference room)" are from large to small, thus the three words can be respectively marked with NAM1, NAM2 and NAM3; "lecture" is an object of the sentence, and is marked with NO; "明天 (tomorrow)" and "下午 (afternoon)" which represent time can be marked with T1 and T2 according to the time ranges thereof. After the tags are marked, all the sentences in the corpus can be represented by tag sequences, for example, the sentence above can be marked with "NS V NO NAM3 NAM2 NAM1 T1 T2".

In other embodiments, the segmenter 110 further comprises a third tag unit 114, wherein the third tag unit 114 is configured for adding a third tag for the tagged sentences having the same tag sequence but different meanings according to the meanings of the words. For example, the Mandarin Chinese sentence "考古学家于1965年五一节在云南省元谋县上那蚌村发现了元谋人牙齿化石 (An archaeologist discovered the teeth fossil of Yuanmou Man in Shangnabang village Yuanmou county, Yunnan province on May Day in 1965)" has the identical tag sequence with the sentence above after being segmented and tagged. However, the content of the two sentences is obviously distinct, and thus requires being distinguished. In the present embodiment, the adding sequence of the three tags is not defined.

The classifier 120 is configured for identifying the knowledge-driven sentence, and classifying sentences having different tag sequences but the same meaning into the same sentence cluster. The classifier 120 classifies the sentences in each monolingual parallel corpus into a plurality of different sentence clusters, wherein each sentence cluster comprises all the categories of sentence structures of the sentences having the same meaning, in which case the sentences having the same tag sequence have the same sentence structure.

The mapper 130 is configured for analyzing the sentences in the sentence clusters of each monolingual parallel corpus, determining the categories of sentence structures of all the sentences in the sentence clusters of each monolingual parallel corpus, determining, recording and storing a mapping relationship for transforming tags between corresponding sentence structures when different categories of sentence structures in the same sentence cluster are transformed. In the present embodiment, if m categories of sentence structures are stored in a sentence cluster, then m (m−1)/2 categories of mapping relationships can be generated between the m categories of structures. All the sentence structures in the sentence cluster are mapped, and the generated mapping relationship is determined, recorded and stored.

The sentence structure generator 140 is configured for searching for a first category of sentence structures in each sentence cluster of each monolingual parallel corpus, and mapping, according to a mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures in the remaining sentence clusters.

The sentence structure generation module 140 is configured for searching for a first category of sentence structures in each sentence cluster of all the monolingual parallel corpora, and mapping, according to a first mapping mode between the first category of sentence structures in one of the sentence clusters and other categories of sentence structures in the same sentence cluster, the first category of sentence structures in other sentence clusters in accordance with the mapping mode to generate corresponding categories of sentence structures. In the present embodiment, a sentence cluster is randomly selected from a monolingual parallel corpus to compare with all the sentence clusters in other monolingual parallel corpora one by one. Assuming that the number of the monolingual parallel corpora is n, then totally n (n−1)/2 times of comparisons are performed to find out the same sentence structure in every two compared sentence clusters. In the present embodiment, a sentence cluster K and a sentence cluster L are compared; the sentence structures a, b, c, d and e in the sentence cluster K have the same meaning; the sentence structures d, e and f in the sentence cluster L have the same meaning; therefore, totally two sentence structures d and e in the sentence clusters K and L are in the same category. Under the processing of the mapping module 130, mapping relationships are generated between the sentence structures d, e and the sentence structures a, b and c respectively in the sentence cluster K, and the mapping modes thereof are recorded; and mapping relationships are generated between the sentence structures d, e and the sentence structure f in the sentence cluster L, and the mapping modes thereof are recorded. And then, corresponding mapping relationships a', b' and c' are established in the sentence cluster L according to the mapping relationships between the sentence structures d, e and the sentence structures a, b and c in the sentence cluster K; and a corresponding mapping relationship f'' is established in the sentence cluster K according to the mapping relationships between the sentence structures d, e and the sentence structure f in the sentence cluster L, in which case the generated new sentence cluster comprises six categories of sentence structures.

The corpus generator 150 nests a word corresponding to the sequence tag of a sentence structure in the sentence cluster into the generated sentence structures in all the sentence clusters to generate corpora. Combining the generated multiple new sentence clusters to generate a new monolingual parallel corpus. The corpus generator 150 comprises a tag identification unit 151 and a corpus generation unit 152, wherein the tag identification unit 151 identifies the tags of all the sentence structures in each sentence cluster; and the corpus generation unit 152 nests the words corresponding to the tags of all the sentence structures in each sentence cluster into the sentence structures to generate corpora. The corpus generation unit 152 nests the sentence structures according to the tagging standard of the segmenter 110. In the present embodiment, the sentence structure generated by the sentence structure generator 140 contains the tag NS, so the word "小红 (Xiaohong)" or "考古学家 (archaeologist)" can be nested according to the meanings of the sentences in the sentence cluster.

Different from the prior art, the corpus generation device of the present invention tags the sentences in an existing corpus, can acquire more sentence structures by mapping the sentence structures having different tag sequences according to the tags of the sentence structures, and can acquire more corpora by filling and nesting the words corresponding to the tags. The present invention can acquire a corpus by nesting a word in an expanded sentence structure, is simple to operate, saves resources, and expands the corpus to a great extent.

Figure 2:
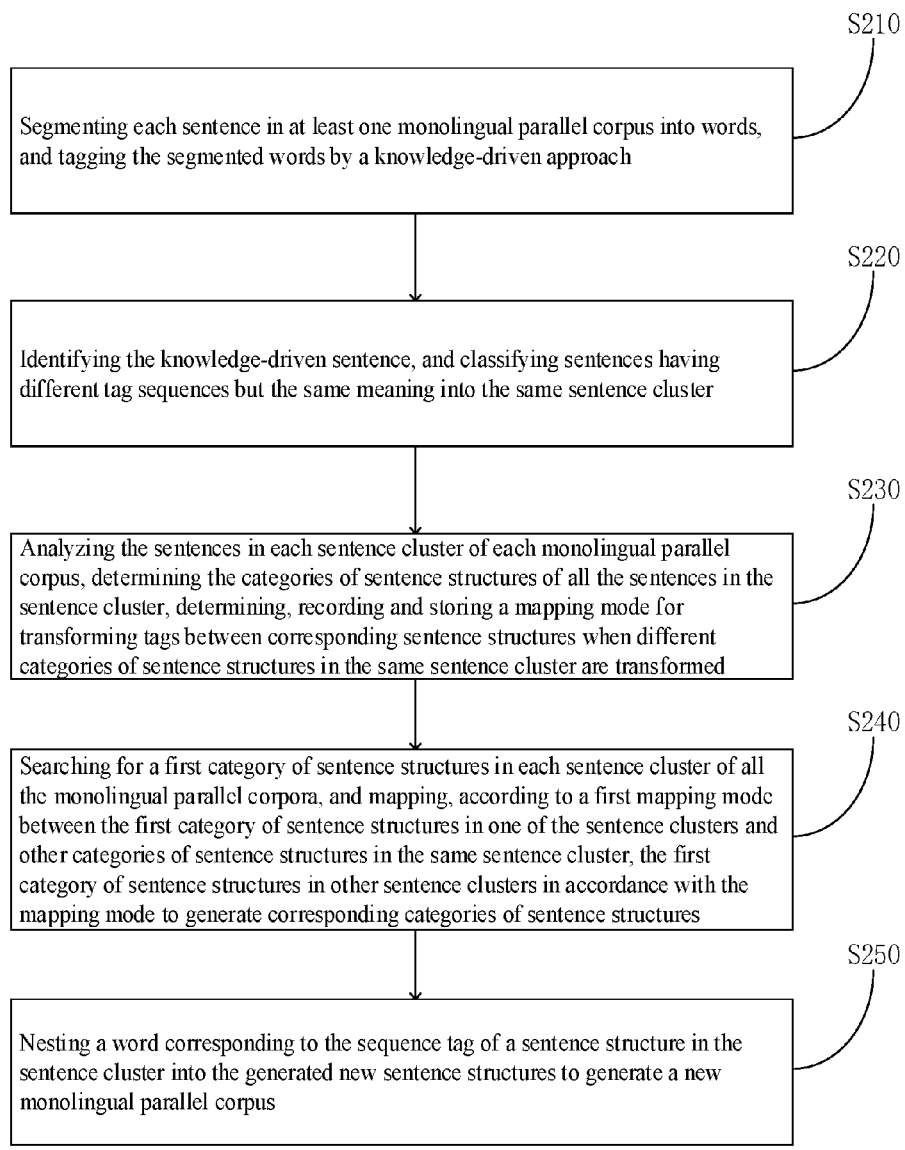
FIG. 2 is a flow chart of the corpus generation method according to an embodiment of the present invention.

Please refer to FIG. 2 which is a flow chart of the corpus generation method according to an embodiment of the present invention. The step comprises the steps of:

S210, segmenting each sentence in at least one monolingual parallel corpus into words, and tagging the segmented words by a knowledge-driven approach.

Connecting a monolingual parallel corpus, segmenting sentences in the parallel corpus into words, and then tagging the segmented words by a knowledge-driven approach. Segmentation is generally performed by using segmentation tool software.

The segmenting and tagging steps comprise:

S211, segmenting the sentences in the parallel corpus into words;

Connecting the segmentation tool software on the Internet, and importing a to-be-segmented sentence into the segment tool software for segmentation.

S212, adding a first tag for the segmented sentences according to the parts-of-speech of the words.

The Mandarin Chinese sentence "小红明天下午要去深圳市科技馆九层会议室参加科普知识讲座 (Xiaohong will go to attend a scientific knowledge lecture in a conference room on the ninth floor of Shenzhen Science and Technology Museum tomorrow afternoon)" is selected from a corpus, and is segmented into "'小红 (Xiaohong)/要 (will)/去 (go to)/参加 (attend)/科普 (a scientific)/知识 (knowledge)/讲座 (lecture)/会议室 (in a conference room)/九层 (on the ninth floor of)/深圳市 (Shenzhen)/科技馆 (Science and Technology Museum)/明天 (tomorrow)/下午 (afternoon)." Wherein "小红(Xiaohong)", "深圳市 (Shenzhen)", "科技馆 (Science and Technology Museum)", "会议室 (conference room)" and "讲座 (lecture)" are nouns, and are marked with the same first tag, generally N (noun), according to the parts-of-speech thereof; "明天 (tomorrow)" and "下午 (afternoon)" represent time, and are marked with the first tag T (time); "参加 (attend)" is a verb, and is marked with the first tag V (verb); "要 (will)", "去 (go to)", "九层 (the ninth floor)" and "科普知识 (scientific knowledge)" are additional words, and can be omitted and not marked.

S213, adding a second tag for the sentence having added the first tag according to the sentence elements the words act as.

After the first tags are marked, second tags can continue to be marked. With regard to the words "小红 (xiaohong)", "深圳市 (Shenzhen)", "科技馆 (Science and Technology Museum)", "会议室 (conference room)" and "讲座 (lecture)" having marked with the first tag N (noun), "小红 (Xiaohong)" is a character noun, is the subject of the sentence, and is thus marked with the second tag NS (noun/subject); "深圳市 (Shenzhen)", "科技馆 (Science and Technology Museum)" and "会议室 (conference room)" are nouns respectively representing places having different place ranges, and are usually adverbial modifiers, wherein the ranges represented by the three words "深圳市 (Shenzhen)", "科技馆 (Science and Technology Museum)" and "会议室 (conference room)" are from large to small, thus the three words can be respectively marked with NAM1, NAM2 and NAM3; "讲座 (lecture)" is an object of the sentence, and is marked with NO; "明天 (tomorrow)" and "下午 (afternoon)" which represent time can be marked with T1 and T2 according to the time ranges thereof. After the tags are marked, all the sentences in the corpus can be represented by tag sequences, for example, the sentence above can be marked with "NS V NO NAM3 NAM2 NAM1 T1 T2".

S214, adding a third tag for the tagged sentences having the same tag sequence but different meanings according to the meanings of the words.

Adding a third tag for the tagged sentences having the same tag sequence but different meanings according to the meanings of the words. For example, the Mandarin Chinese sentence "考古学家于1965年五一节在云南省元谋县上那蚌村发现了元谋人牙齿化石 (An archaeologist discovered the teeth fossil of Yuanmou Man in Shangnabang village Yuanmou county, Yunnan province on May Day in 1965)" has the identical tag sequence with the sentence above after being segmented and tagged. However, the content of the two sentences is obviously distinct, and thus requires being distinguished.

S220, identifying the knowledge-driven sentence, and classifying sentences having different tag sequences but the same meaning into the same sentence cluster.

Identifying the segmented sentence, and classifying sentences having different tag sequences but the same meaning into the same sentence cluster. Classifying the sentences in a corpus into a plurality of different sentence clusters, wherein each sentence cluster comprises all the categories of sentence structures of the sentences having the same meaning, in which case the sentences having the same tag sequence have the same sentence structure.

S230, analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed.

Analyzing the sentences in each sentence cluster, determining the categories of sentence structures of all the sentences in the sentence cluster, determining, recording and storing a mapping relationship for transforming tags between corresponding sentence structures when different categories of sentence structures in the same sentence cluster are transformed. In the present embodiment, if m categories of sentence structures are stored in a sentence cluster, then m (m−1)/2 categories of mapping relationships can be generated between the m categories of structures. All the sentence structures in the sentence cluster are mapped, and the generated mapping relationship is determined, recorded and stored.

S240, searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures.

Each sentence cluster is analyzed to search for all the sentence structures in the sentence cluster. In the present embodiment, a sentence cluster is randomly selected therein to compare with other sentence clusters one by one. Assuming that the number of the monolingual parallel corpora is n, then totally n (n−1)/2 times of comparisons are performed to find out the same sentence structure in every two compared sentence clusters. In the present embodiment, a sentence cluster K and a sentence cluster L are compared; the sentence structures a, b, c, d and e in the sentence cluster K have the same meaning; the sentence structures d, e and f in the sentence cluster L have the same meaning; therefore, totally two sentence structures d and e in the sentence clusters K and L are in the same category. Under the processing of the mapping module 130, mapping relationships are generated between the sentence structures d, e and the sentence structures a, b and c respectively in the sentence cluster K, and the mapping modes thereof are recorded; and mapping relationships are generated between the sentence structures d, e and the sentence structure f in the sentence cluster L, and the mapping modes thereof are recorded. And then, corresponding mapping relationships a', b' and c' are established in the sentence cluster L according to the mapping relationships between the sentence structures d, e and the sentence structures a, b and c in the sentence cluster K; and a corresponding mapping relationship f'' is established in the sentence cluster K according to the mapping relationships between the sentence structures d, e and the sentence structure f in the sentence cluster L, in which case the sentence clusters K and L both comprise six categories of sentence structures, thus the sentence structures are expanded.

Every two of all the sentence clusters are compared to expand each sentence cluster. Finally, each sentence cluster comprises the same number of sentence structures with that in the union set of the sentence structures of all the sentence clusters.

S250, nesting a word corresponding to the sequence tag of a sentence structure in the sentence cluster into the generated new sentence structures to generate a new monolingual parallel corpus.

The step of acquiring corpora comprises:

S251, identifying the tags of all the sentence structures in each sentence cluster of all the monolingual parallel corpora.

Identifying the tags in all the sentence structures of each sentence cluster, and nesting the sentence structures according to a tagging standard.

S252, nesting the words corresponding to the tags in all the sentence structures of each sentence cluster into the sentence structures to generate a new monolingual parallel corpus.

Nesting the words corresponding to the tags in all the sentence structures of each sentence cluster into the sentence structures to generate a new sentence cluster. Combining the generated multiple new sentence clusters to generate a new monolingual parallel corpus. In the present embodiment, the generated sentence structure contains the tag NS, so the word "小红 (Xiaohong)" or "考古学家 (archaeologist)" can be nested according to the meanings of the sentences in the sentence cluster.

Different from the prior art, the corpus generation method of the present invention tags the sentences in an existing corpus, can acquire more sentence structures by mapping the sentence structures having different tag sequences according to the tags of the sentence structures, and can acquire more corpora by filling and nesting the words corresponding to the tags. The present invention can acquire a corpus by nesting a word in an expanded sentence structure, is simple to operate, saves resources, and expands the corpus to a great extent.

Figure 3:
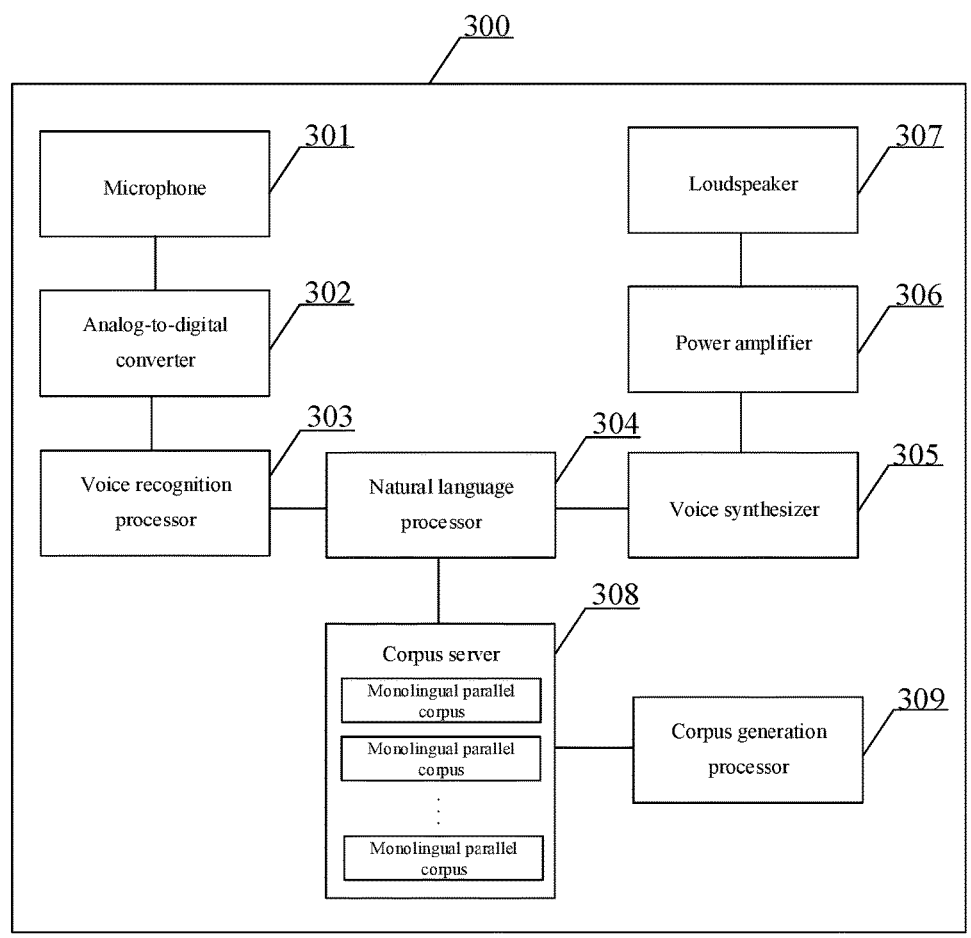
FIG. 3 is a schematic view of the human-machine interaction system according to an embodiment of the present invention.

As shown in FIG. 3, the present embodiment provides a human-machine interaction system 300, comprising a microphone 301, an analog-to-digital converter 302, a voice identification processor 303, a natural language processor 304, a voice synthesizer 305, a power amplifier 306, a loudspeaker 307, a corpus server 308, and a corpus generation processor 309, wherein a plurality of monolingual parallel corpora are stored in the corpus server 308.

The microphone 301, the analog-to-digital converter 302, the voice identification processor 303, the natural language processor 304, the voice synthesizer 305, the power amplifier 306, and the loudspeaker 307 are sequentially connected; the corpus server 308 is connected to the natural language processor 304; and the corpus generation processor 309 is connected to the corpus server 308.

The microphone 301 is configured for acquiring a voice signal from a user when the user and a robot are dialoging; the analog-to-digital converter 302 is configured for converting the voice signal into voice digital information; the voice identification processor 303 is configured for converting the voice digital information into text information, and inputting the text information into the natural language processor;

The natural language processor 304 is configured for analyzing and determining the text information, generating an appropriate reply message by combining the corpora in the corpus server 308, transmitting the reply message to the voice synthesizer 305, and storing the text information and the reply message in the corpus server 308. Wherein the natural language processor 304 can be a central processing unit (CPU), an application specific integrated circuit (ASIC), a field-programmable gate array (FPGA), or a complex programmable logic device (CPLD), wherein a natural language processing algorithm for completing the conversion between a natural language and a machine language is stored in the natural language processor 304, such that the machine can understand human languages and give a reply. The natural language processing algorithm can be any one natural language processing algorithm in the prior art, which will not be specifically defined in the present invention.

The voice synthesizer 305 is configured for generating a voice signal according to the reply message, amplifying the voice signal via the power amplifier 306, and playing the amplified voice signal via the loudspeaker 307.

The corpus generation processor 309 is configured for executing programs to realize the following steps:

S210, segmenting each sentence in at least one monolingual parallel corpus into words, and tagging the segmented words by a knowledge-driven approach.

Connecting a monolingual parallel corpus, segmenting sentences in the parallel corpus into words, and then tagging the segmented words by a knowledge-driven approach. Segmentation is generally performed by using segmentation tool software.

The segmenting and tagging steps comprise:

S211, segmenting the sentences in the parallel corpus into words;

Connecting the segmentation tool software on the Internet, and importing a to-be-segmented sentence into the segment tool software for segmentation.

S212, adding a first tag for the segmented sentences according to the parts-of-speech of the words.

The Mandarin Chinese sentence "小红明天下午要去深圳市科技馆九层会议室参加科普知识讲座 (Xiaohong will go to attend a scientific knowledge lecture in a conference room on the ninth floor of Shenzhen Science and Technology Museum tomorrow afternoon)" is selected from a corpus, and is segmented into "小红 (Xiaohong)/要 (will)/去 (go to)/参加 (attend)/科普 (a scientific)/知识 (knowledge)/讲座 (lecture)/会议室 (in a conference room)/九层 (on the ninth floor of)/深圳市 (Shenzhen)/科技馆 (Science and Technology Museum)/明天 (tomorrow)/下午 (afternoon)." Wherein "小红 (Xiaohong)", "深圳市 (Shenzhen)", "科技馆 (Science and Technology Museum)", "会议室 (conference room)" and "讲座 (lecture)" are nouns, and are marked with the same first tag, generally N (noun), according to the parts-of-speech thereof; "明天 (tomorrow)" and "下午 (afternoon)" represent time, and are marked with the first tag T (time); "参加 (attend)" is a verb, and is marked with the first tag V (verb); "要 (will)", "去 (go to)", "九层 (the ninth floor)" and "科普知识 (scientific knowledge)" are additional words, and can be omitted and not marked.

S213, adding a second tag for the sentence having added the first tag according to the sentence elements the words act as.

After the first tags are marked, second tags can continue to be marked. With regard to the words "小红 (Xiaohong)", "深圳市 (Shenzhen)", "科技馆 (Science and Technology Museum)", "会议室 (conference room)" and "讲座 (lecture)" having marked with the first tag N (noun), "小红 (Xiaohong)" is a character noun, is the subject of the sentence, and is thus marked with the second tag NS (noun/subject); "深圳市 (Shenzhen)", "科技馆 (Science and Technology Museum)" and "会议室 (conference room)" are nouns respectively representing places having different place ranges, and are usually adverbial modifiers, wherein the ranges represented by the three words "深圳市 (Shenzhen)", "科技馆 (Science and Technology Museum)" and "会议室 (conference room)" are from large to small, thus the three words can be respectively marked with NAM1, NAM2 and NAM3; "讲座 (lecture)" is an object of the sentence, and is marked with NO; "明天 (tomorrow)" and "下午 (afternoon)" which represent time can be marked with T1 and T2 according to the time ranges thereof. After the tags are marked, all the sentences in the corpus can be represented by tag sequences, for example, the sentence above can be marked with "NS V NO NAM3 NAM2 NAM1 T1 T2".

S214, adding a third tag for the tagged sentences having the same tag sequence but different meanings according to the meanings of the words.

Adding a third tag for the tagged sentences having the same tag sequence but different meanings according to the meanings of the words. For example, the Mandarin Chinese sentence "考古学家于1965年五一节在云南省元谋县上那蚌村发现了元谋人牙齿化石 (An archaeologist discovered the teeth fossil of Yuanmou Man in Shangnabang village Yuanmou county, Yunnan province on May Day in 1965)" has the identical tag sequence with the sentence above after being segmented and tagged. However, the content of the two sentences is obviously distinct, and thus requires being distinguished.

S220, identifying the knowledge-driven sentence, and classifying sentences having different tag sequences but the same meaning into the same sentence cluster.

Identifying the segmented sentence, and classifying sentences having different tag sequences but the same meaning into the same sentence cluster. Classifying the sentences in a corpus into a plurality of different sentence clusters, wherein each sentence cluster comprises all the categories of sentence structures of the sentences having the same meaning, in which case the sentences having the same tag sequence have the same sentence structure.

S230, analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed.

Analyzing the sentences in each sentence cluster, determining the categories of sentence structures of all the sentences in the sentence cluster, determining, recording and storing a mapping relationship for transforming tags between corresponding sentence structures when different categories of sentence structures in the same sentence cluster are transformed. In the present embodiment, if m categories of sentence structures are stored in a sentence cluster, then m (m−1)/2 categories of mapping relationships can be generated between the m categories of structures. All the sentence structures in the sentence cluster are mapped, and the generated mapping relationship is determined, recorded and stored.

S240, searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures.

Each sentence cluster is analyzed to search for all the sentence structures in the sentence cluster. In the present embodiment, a sentence cluster is randomly selected therein to compare with other sentence clusters one by one. Assuming that the number of the monolingual parallel corpora is n, then totally n (n−1)/2 times of comparisons are performed to find out the same sentence structure in every two compared sentence clusters. In the present embodiment, a sentence cluster K and a sentence cluster L are compared; the sentence structures a, b, c, d and e in the sentence cluster K have the same meaning; the sentence structures d, e and f in the sentence cluster L have the same meaning; therefore, totally two sentence structures d and e in the sentence clusters K and L are in the same category. Under the processing of the mapper 130, mapping relationships are generated between the sentence structures d, e and the sentence structures a, b and c respectively in the sentence cluster K, and the mapping relationships thereof are recorded; and mapping relationships are generated between the sentence structures d, e and the sentence structure f in the sentence cluster L, and the mapping relationships thereof are recorded. And then, corresponding mapping relationships a', b' and c' are established in the sentence cluster L according to the mapping relationships between the sentence structures d, e and the sentence structures a, b and c in the sentence cluster K; and a corresponding mapping relationship f" is established in the sentence cluster K according to the mapping relationships between the sentence structures d, e and the sentence structure f in the sentence cluster L, in which case the sentence clusters K and L both comprise five categories of sentence structures, thus the sentence structures are expanded.

Every two of all the sentence clusters are compared to expand each sentence cluster. Finally, each sentence cluster comprises the same number of sentence structures with that in the union set of the sentence structures of all the sentence clusters.

S250, nesting a word corresponding to the sequence tag of a sentence structure in the sentence cluster into the generated new sentence structures to generate a new monolingual parallel corpus.

The step of acquiring corpora comprises:

S251, identifying the tags of all the sentence structures in each sentence cluster of all the monolingual parallel corpora;

Identifying the tags in all the sentence structures of each sentence cluster, and nesting the sentence structures according to a tagging standard.

S252, nesting the words corresponding to the tags in all the sentence structures of each sentence cluster into the sentence structures to generate a new monolingual parallel corpus.

Nesting the words corresponding to the tags in all the sentence structures of each sentence cluster into the sentence structures to generate a new sentence cluster. Combining the generated multiple new sentence clusters to generate a new monolingual parallel corpus. In the present embodiment, the generated sentence structure contains the tag NS, so the word "小红 (Xiaohong)" or "考古学家 (archaeologist)" can be nested according to the meanings of the sentences in the sentence cluster.

The human-machine interaction system 300 of the present embodiment tags the sentences in an existing corpus, can acquire more sentence structures by mapping the sentence structures having different tag sequences according to the tags of the sentence structures, and can acquire more corpora by filling and nesting the words corresponding to the tags. The present invention is simple to operate, saves resources, and can expand a corpus to a great extent. On the basis of the corpus generation processor capable of automatically expanding the corpus, the human-machine interaction system of the present embodiment can constantly automatically and recurrently produce new corpora, such that a robot can generate richer and more natural languages when having a voice chat with a user, thus enabling the language expression mode of the robot to be rich and varied. The system can increase the personified content of the robot during interaction, thus improving human-machine interaction experience.

Figure 4:
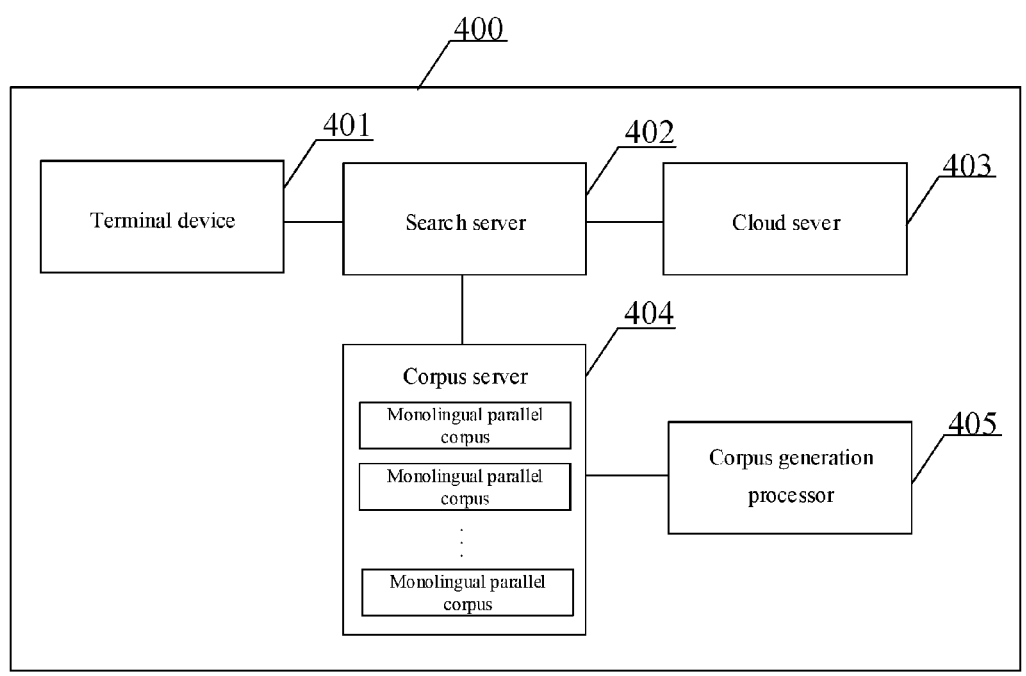
FIG. 4 is a structural schematic diagram of the search system according to an embodiment of the present invention.

As shown in FIG. 4, on the basis of the corpus generation method, the present invention provides a search system 400, comprising a terminal device 401, a search server 402, a cloud server 403, a corpus server 404, and a corpus generation processor 405. A user inputs a key word into the terminal device 401, and the terminal device transmits the key word to the search server 402. The search server 402 utilizes the corpora in the corpus server 404 to generate a plurality of search words matched with the key word, searches in the cloud server 403 for the information matched with the search words, and feeds back the searched information to the terminal device 401.

A plurality of monolingual parallel corpora are stored in the corpus server 404; the corpus generation processor 405 is configured for executing programs to realize the following steps:

Step S210, segmenting each sentence in at least one monolingual parallel corpus into words, and tagging the segmented words by a knowledge-driven approach;

Step S211, identifying the knowledge-driven sentence, and classifying sentences having different tag sequences but the same meaning into the same sentence cluster;

Step S212, analyzing the sentences in each sentence cluster of each monolingual parallel corpus, determining the categories of sentence structures of all the sentences in the sentence cluster, determining, recording and storing a mapping relationship for transforming tags between corresponding sentence structures when different categories of sentence structures in the same sentence cluster are transformed;

Step S213, searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and Step S214, nesting a word corresponding to the sequence tag of a sentence structure in the sentence cluster into the generated new sentence structures to generate a new monolingual parallel corpus, and storing the new monolingual parallel corpus in the corpus server 404.

The search system of the present embodiment can automatically expand the key word inputted by the user. For example, the user inputs "鹏城 (Pengcheng)" which is another name for "深圳市 (Shenzhen)"; if search is performed directly according to "鹏城 (Pengcheng)," then a lot of information will be omitted. On the basis of the corpus generation processor 405 in the present embodiment, the existing corpus "深圳市 (Shenzhen)" in the corpora is expanded to acquire the associated corpus "鹏城 (Pengcheng)." The corpus server 404 can expand the search word "鹏城 (Pengcheng)" to "深圳市 (Shenzhen)" to improve the search range and accuracy.

At present, expanding a corpus requires the participation of many people, and requires a large number of industrial professionals to spend a lot of time and energies. In the era of data explosion, a large amount of new data and new words are produced every day. The existing search system cannot automatically update the corpus, and is difficult to ensure that an appropriate search word can be generated. The search system of the present embodiment tags the sentences in an existing corpus, can acquire more sentence structures by mapping the sentence structures having different tag sequences according to the tags of the sentence structures, and can acquire more corpora by filling and nesting the words corresponding to the tags. The present invention is simple to operate, saves resources, and can expand a corpus to a great extent. On the basis of the corpus generation processor 405 capable of automatically expanding the corpus, the search system of the present embodiment can constantly automatically and recurrently produce new corpora, such that the search system can generate more comprehensive search words during search according to the key word inputted by the user, thus improving search range and accuracy.

Figure 5:
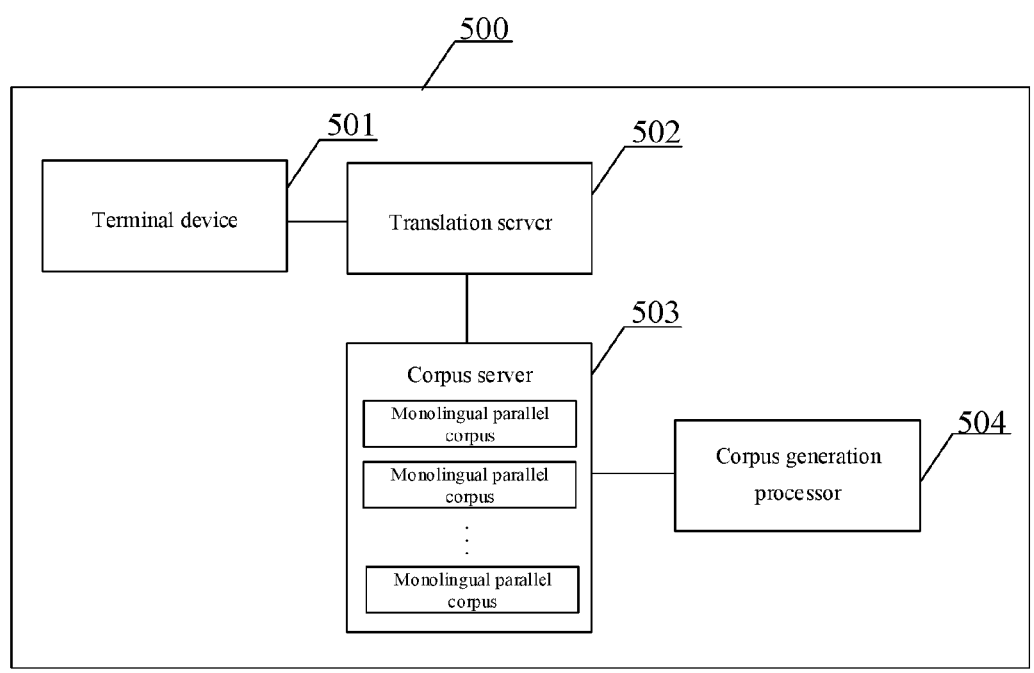
FIG. 5 is a structural schematic diagram of the translation system according to an embodiment of the present invention.

As shown in FIG. 5, on the basis of the corpus generation method, the present invention provides a translation system 500, comprising a terminal device 501, a translation server 502, a corpus server 503, and a corpus generation processor 504.

A user inputs a to-be-translated sentence into the terminal device 501, and the terminal device transmits the to-be-translated sentence to the translation server 502; a plurality of parallel corpora are stored in the corpus server 503. The translation server 502 utilizes the parallel corpora in the corpus server 503 to acquire a translated sentence, and feeds back the translated sentence to the terminal device 501. The specific method by utilizing a parallel corpus to translate is a prior art which will not be repeated here.

The corpus generation processor 504 is configured for executing programs to realize the following steps:

Step S210, segmenting each sentence in at least one parallel corpus into words, and tagging the segmented words by a knowledge-driven approach;

Step S211, identifying the knowledge-driven sentence, and classifying sentences having different tag sequences but the same meaning into the same sentence cluster;

Step S212, analyzing the sentences in each sentence cluster of each parallel corpus, determining the categories of sentence structures of all the sentences in the sentence cluster, determining, recording and storing a mapping relationship for transforming tags between corresponding sentence structures when different categories of sentence structures in the same sentence cluster are transformed;

Step S213, searching for a first category of sentence structures in each sentence cluster of all the parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and Step S214, nesting a word corresponding to the sequence tag of a sentence structure in the sentence cluster into the generated new sentence structures to generate a new parallel corpus, and storing the new parallel corpus in the corpus server 503.

At present, expanding a corpus requires the participation of many people, and requires a large number of industrial professionals to spend a lot of time and energies. In the era of data explosion, a large amount of new data and new words are produced every day. If a corpus sequentially acquires and inputs all the corpora, a great many of efforts are required to be invested and omission is easy to occur. The translation system 500 of the present embodiment tags the sentences in an existing corpus, can acquire more sentence structures by mapping the sentence structures having different tag sequences according to the tags of the sentence structures, and can acquire more corpora by filling and nesting the words corresponding to the tags. The present invention is simple to operate, saves resources, and can expand a corpus to a great extent. On the basis of the corpus generation processor 504 capable of automatically expanding the corpus, the search system of the present embodiment can constantly automatically and recurrently produce new corpora, such that the translation system 500 can acquire more accurate corpora to improve translation accuracy, and can automatically generate more sentence structures according to the existing corpora in the corpus, thus the same sentence expressed in different manners can be translated into the same translated text.

The above mentioned is only the embodiments of the present invention, which does not limit the patent scope of the present invention, and any equivalent structure or process made by using the specification and the drawings of the present invention or direct or indirect applications in other related technical fields should be contained in the scope of patent protection in a similar way.

What is claimed is:

1. A corpus generation processor configured to execute programs comprising:
   a segmentation module,
      connected to at least one monolingual parallel corpus and
      configured to segment sentences in each monolingual parallel corpus into phrases, and
      tagging the segmented phrases by a knowledge-driven approach, the sentences being in a language in which words are not spaced apart but grouped into the phrases;
   a classification module
      to identify the knowledge-driven sentence, and
      classify sentences having different tag sequences but the same meaning into the same sentence cluster;
   a mapping module configured
      to analyze the sentences in each sentence cluster of each monolingual parallel corpus,
      to determine the categories of sentence structures of all the sentences in the sentence cluster,
      to determine, record and store a mapping relationship to transform tags between corresponding sentence structures when different categories of sentence structures in the same sentence cluster are transformed;
   a sentence structure generation module configured
      to search for a first category of sentence structures in each sentence cluster of all the monolingual parallel corpora, and
      to map, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures;
   a corpus generation module configured
      to nest a phrase corresponding to the sequence tag of a sentence structure in the sentence cluster into the generated new sentence structures to generate a new monolingual parallel corpus;
   wherein the monolingual parallel corpus contains the language in which the words are not spaced apart but grouped into phrases; and
   wherein the knowledge-driven corpus generation device simplifies operation, economizes resources and expands the corpus by:
      (1) tagging the sentences in an existing corpus;
      (2) acquiring more sentence structures by mapping the sentence structures having different tag sequences according to the tags of the sentence structures;
      (3) acquiring more corpora by filling and nesting the phrases corresponding to the tags; and
      (4) acquiring another corpus by nesting the phrase in an expanded sentence structure.

2. The corpus generation device according to claim 1, wherein the segmentation module comprises:
   a segmentation unit configured to segment the sentences in all the monolingual parallel corpora into the phrases;

a first tag unit configured to add a first tag for the segmented sentences according to the parts-of-speech of the phrases; and a second tag unit configured to add a second tag for the segmented sentences according to the sentence elements the phrases act as.

3. The corpus generation device according to claim 2, wherein the segmentation module further comprises a third tag unit, the third tag unit being configured to add a third tag for the tagged sentences having the same tag sequence but different meanings according to the meanings of the phrases.

4. The corpus generation device according to claim 1, wherein the corpus generation module comprises:

a tag identification unit configured to identify the tags of all the sentence structures in each sentence cluster of all the monolingual parallel corpora; and a corpus segmentation unit to next the phrases corresponding to the tags in all the sentence structures of each sentence cluster into the sentence structures to generate a new monolingual parallel corpus.

5. The corpus generation device according to claim 4, wherein the corpus generation unit nests the generated new sentence structures according to the knowledge-driven standard of the segmentation module.

6. The corpus generation device according to claim 1, wherein the monolingual parallel corpus contains Mandarin Chinese texts.

7. A corpus generation method, comprising steps of:

segmenting each sentence in at least one monolingual parallel corpus into phrases, and tagging the segmented phrases by a knowledge-driven approach, said each sentence being in a language in which words are not spaced apart but grouped into the phrases;

identifying a knowledge-driven sentence, and classifying sentences having different tag sequences but the same meaning into the same sentence cluster;

analyzing the sentences in each sentence cluster of each monolingual parallel corpus, determining categories of sentence structures of all the sentences in the sentence cluster, determining, recording and storing a mapping relationship for transforming tags between corresponding sentence structures when different categories of sentence structures in the same sentence cluster are transformed;

searching for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures;

nesting a phrase corresponding to the sequence tag of a sentence structure in the sentence cluster into the generated new sentence structures to generate a new monolingual parallel corpus;

wherein the monolingual parallel corpus contains the language in which the words are not spaced apart but grouped into the phrases; and wherein the method simplifies operation, economizes resources and expands the corpus by: (1) tagging the sentences in an existing corpus; (2) acquiring more sentence structures by mapping the sentence structures having different tag sequences according to the tags of the sentence structures; (3) acquiring more corpora by filling and nesting the phrases corresponding to the tags; and (4) acquiring another corpus by nesting the phrase in an expanded sentence structure.

8. The corpus generation method according to claim 7, wherein the step of segmenting the sentences in parallel corpora into the phrases comprises:

segmenting the sentences in all the monolingual parallel corpora into the phrases;

adding a first tag for the segmented sentences according to the parts-of-speech of the phrases; and adding a second tag for the segmented sentences according to the sentence elements the phrases act as.

9. The corpus generation method according to claim 8, wherein the step of segmenting the sentences in parallel corpora into the phrases further comprises adding a third tag for the tagged sentences having the same tag sequence but different meanings according to the meanings of the phrases.

10. The corpus generation method according to claim 7, wherein the step of nesting the phrases corresponding to the sequence tag of a sentence structure in the sentence cluster into the generated sentence structures in all the sentence clusters comprises:

identifying the tags of all the sentence structures in each sentence cluster of all the monolingual parallel corpora; and nesting the phrases corresponding to the tags in all the sentence structures of each sentence cluster into the sentence structures to generate a corpus.

11. The corpus generation device according to claim 10, wherein the step of nesting the phrases corresponding to the tags into the sentence structures, the generated new sentence structures are nested according to a knowledge-driven standard.

12. The corpus generation method according to claim 7, wherein the monolingual parallel corpus contains Mandarin Chinese texts.

13. A human-machine interaction system, comprising a microphone; an analog-to-digital converter; a voice identification processor; a natural language processor; a voice synthesizer; a power amplifier; a loudspeaker; a corpus server; and a corpus generation processor;

wherein a plurality of monolingual parallel corpora is stored in the corpus server;

wherein the microphone, the analog-to-digital converter, the voice identification processor, the natural language processor, the voice synthesizer, the power amplifier and the loudspeaker are sequentially connected; the corpus server is connected to the natural language processor; and the corpus generation processor is connected to the corpus server;

wherein the microphone is configured to acquire a voice signal from a user when the user and a robot are dialoging, the analog-to-digital converter is configured to convert the voice signal into voice digital information, and the voice identification processor is configured to convert the voice digital information into text information and to input the text information into the natural language processor;

wherein the natural language processor is configured to analyze and determine the text information, to generate an appropriate reply message by combining the corpora in the corpus server, to transmit the reply message to the voice synthesizer, and to store the text information and the reply message in the corpus server;

wherein the voice synthesizer is configured to generate a voice signal according to the reply message, to amplify the voice signal via the power amplifier, and to play the amplified voice signal via the loudspeaker; and the corpus generation processor is configured to execute programs to realize the following:

segment each sentence in at least one monolingual parallel corpus into phrases, and tagging the segmented words by a knowledge-driven approach, said each sentence being in a language in which words are not spaced apart but grouped into the phrases;

identify a knowledge-driven sentence, and classifying sentences having different tag sequences but the same meaning into the same sentence cluster;

analyze the sentences in each sentence cluster of each monolingual parallel corpus, determine categories of sentence structures of all the sentences in the sentence cluster, determine, record and store a mapping relationship to transform tags between corresponding sentence structures when different categories of sentence structures in the same sentence cluster are transformed;

search for a first category of sentence structures in each sentence cluster of all the monolingual parallel corpora, and mapping, according to a first mapping relationship between the first category of sentence structures in one of the sentence clusters and other categories of sentence structures in the same sentence cluster, the first category of sentence structures in other sentence clusters in accordance with the mapping relationship to generate corresponding categories of sentence structures; and nesting a word corresponding to the sequence tag of a sentence structure in the sentence cluster into the generated new sentence structures to generate a new monolingual parallel corpus, and storing the new monolingual parallel corpus in the corpus server;

wherein the monolingual parallel corpus contains the language in which the words are not spaced apart but grouped into the phrases; and wherein the human-machine interaction system (1) constantly, automatically and recurrently produces new corpora such that the robot can generate enhanced and more natural languages when having a voice chat with the user, (2) enables language expression mode of the robot to be enhanced and varied, and (3) increases personified contents of the robot during interaction and improves human-machine interaction experience by: (a) tagging the sentences in an existing corpus; (b) acquiring more sentence structures by mapping the sentence structures having different tag sequences according to the tags of the sentence structures; and (c) acquiring more corpora by filling and nesting the phrases corresponding to the tags.

14. The human-machine interaction system according to claim 13, wherein the corpus generation processor is configured to segment the sentences in all the monolingual parallel corpora into phrases, to add a first tag for the segmented sentences according to the parts-of-speech of the phrases, and to add a second tag for the segmented sentences according to the sentence elements the phrases act as.

15. The human-machine interaction system according to claim 14, wherein the corpus generation processor is configured to add a third tag for the tagged sentences having the same tag sequence but different meanings according to the meanings of the phrases.

16. The human-machine interaction system according to claim 13, wherein the corpus generation processor is configured to nest a phrase corresponding to the sequence tag of a sentence structure in the sentence cluster into the generated sentence structures in all the sentence clusters by: identifying the tags of all the sentence structures in each sentence cluster of all the monolingual parallel corpora; and nesting the phrases corresponding to the tags in all the sentence structures of each sentence cluster into the sentence structures to generate a corpus.

17. The human-machine interaction system according to claim 16, wherein the corpus generation processor is configured to nest the generated new sentence structures according to a knowledge-driven standard.

18. The human-machine interaction system according to claim 13, wherein the monolingual parallel corpus contains Mandarin Chinese texts.

\* \* \* \* \*